US010167912B2

(12) United States Patent
Kirkpatrick

(10) Patent No.: US 10,167,912 B2
(45) Date of Patent: Jan. 1, 2019

(54) PLATE ASSEMBLIES INCLUDING FLOATING WEAR LININGS FOR MULTI-DISK BRAKE SYSTEMS AND METHODS FOR REDUCING VIBRATION IN A MULTI-DISK BRAKE SYSTEM

(71) Applicant: GOODRICH CORPORATION, Charlotte, NC (US)

(72) Inventor: Christopher T. Kirkpatrick, Pueblo West, CO (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/878,660

(22) Filed: Jan. 24, 2018

(65) Prior Publication Data

US 2018/0149216 A1   May 31, 2018

Related U.S. Application Data

(62) Division of application No. 14/981,342, filed on Dec. 28, 2015, now Pat. No. 9,909,632.

(51) Int. Cl.
| | |
|---|---|
| *F16D 55/36* | (2006.01) |
| *F16D 65/00* | (2006.01) |
| *F16D 55/24* | (2006.01) |
| *F16D 65/18* | (2006.01) |
| *F16D 69/04* | (2006.01) |
| *F16D 55/00* | (2006.01) |

(52) U.S. Cl.
CPC ......... *F16D 65/0006* (2013.01); *F16D 55/24* (2013.01); *F16D 55/36* (2013.01); *F16D 65/186* (2013.01); *F16D 69/0408* (2013.01); *F16D 2055/0058* (2013.01); *F16D 2055/0095* (2013.01); *F16D 2069/0433* (2013.01)

(58) Field of Classification Search
CPC ...... F16D 55/24; F16D 55/36; F16D 65/0006; F16D 65/02; F16D 2055/0058; F16D 2055/0095; F16D 2069/0433
USPC ......................................... 188/71.5, 218 XL
See application file for complete search history.

(56) References Cited

U.S. PATENT DOCUMENTS

| 2,451,329 A | 10/1947 | Gaenssle |
| 3,295,641 A | 1/1967 | Eaton et al. |
| 4,018,311 A | 4/1977 | Tickle |
| (Continued) | | |

FOREIGN PATENT DOCUMENTS

| EP | 0716244 | 6/1996 |
| EP | 2126398 | 12/2009 |
| (Continued) | | |

OTHER PUBLICATIONS

Notice of Allowance dated Apr. 26, 2016 in U.S. Appl. No. 14/610,092.

(Continued)

*Primary Examiner* — Thomas W Irvin
(74) *Attorney, Agent, or Firm* — Snell & Wilmer, L.L.P.

(57) ABSTRACT

A plate assembly for a multi-disk brake system is provided. The plate assembly includes at least one of a pressure plate or an end plate and a floating plate wear liner mounted against the at least one of the pressure plate or the end plate. The floating plate wear liner is configured to contact a contact surface of an adjacent rotatable friction disk in response to the multi-disk brake system being actuated.

17 Claims, 7 Drawing Sheets

(56) References Cited

U.S. PATENT DOCUMENTS

| | | | |
|---|---|---|---|
| 4,117,912 A | 10/1978 | Ruppe, Jr. | |
| 4,362,225 A | 12/1982 | Drott | |
| 4,433,757 A | 2/1984 | Warwick | |
| 4,613,021 A | 9/1986 | Lacombe et al. | |
| 4,878,563 A | 11/1989 | Baden | |
| 5,099,960 A | 3/1992 | Alev | |
| 5,558,186 A | 9/1996 | Hyde | |
| 5,636,717 A | 6/1997 | Cardenas | |
| 5,779,006 A | 7/1998 | Hyde et al. | |
| 6,006,885 A | 12/1999 | Borgeaud et al. | |
| 6,193,024 B1 | 2/2001 | Heppes et al. | |
| 6,702,068 B1 | 3/2004 | Riebe | |
| 6,719,106 B1 * | 4/2004 | Gardner | B64C 13/28 188/134 |
| 7,556,128 B2 | 7/2009 | Mayberry | |
| 7,673,725 B2 * | 3/2010 | Drennen | F16D 65/12 188/18 A |
| 8,978,843 B2 * | 3/2015 | Kirkpatrick | F16D 55/36 188/218 XL |
| 9,127,731 B2 * | 9/2015 | Kirkpatrick | B64C 25/42 |
| 9,169,884 B2 | 10/2015 | Hoots et al. | |
| 9,194,447 B2 | 11/2015 | Kirkpatrick | |
| 9,315,261 B2 * | 4/2016 | Kirkpatrick | B64C 25/44 |
| 9,366,302 B1 * | 6/2016 | Kirkpatrick | F16D 65/12 |
| 9,541,145 B2 | 1/2017 | Kirkpatrick | |
| 9,587,691 B2 | 3/2017 | Kirkpatrick | |
| 2002/0179382 A1 | 12/2002 | Fryska et al. | |
| 2004/0216969 A1 * | 11/2004 | Prahst | F16D 65/128 188/218 XL |
| 2006/0108188 A1 | 5/2006 | Baumann | |
| 2015/0001017 A1 | 1/2015 | Kirkpatrick | |
| 2016/0215838 A1 | 7/2016 | Kirkpatrick | |
| 2016/0333470 A1 | 11/2016 | Kirkpatrick | |
| 2017/0138423 A1 | 5/2017 | Kirkpatrick | |

FOREIGN PATENT DOCUMENTS

| | | | |
|---|---|---|---|
| EP | 2824353 | 1/2015 | |
| JP | S59197631 A * | 11/1984 | ........... F16D 65/123 |
| JP | 02286926 | 11/1990 | |

OTHER PUBLICATIONS

Preinterview First Office Action dated Jun. 9, 2016 in U.S. Appl. No. 14/606,511.
Extended European Search Report dated Jun. 14, 2016 in European Application No. 16152897.1.
Extended European Search Report dated Jun. 14, 2016 in European Application No. 16153489.6.
First Action Interview Office Action dated Sep. 26, 2016 in U.S. Appl. No. 14/606,511.
Notice of Allowance dated Jan. 6, 2017 in U.S. Appl. No. 14/606,511.
Extended European Search Report dated May 11, 2017 in European Application No. 16205699.8.
Restriction Requirement dated Mar. 20, 2017 in U.S. Appl. No. 14/981,342.
Pre-Interview First Office Action dated Jun. 16, 2017 in U.S. Appl. No. 14/981,342.
First Action Interview Office Action dated Jul. 25, 2017 in U.S. Appl. No. 14/981,342.
Notice of Allowance dated Nov. 15, 2017 in U.S. Appl. No. 14/981,342.
Notice of Allowance dated Nov. 15, 2017 in Application No. 14/981,342.

* cited by examiner

PLATE ASSEMBLIES INCLUDING FLOATING WEAR LININGS FOR MULTI-DISK BRAKE SYSTEMS AND METHODS FOR REDUCING VIBRATION IN A MULTI-DISK BRAKE SYSTEM

CROSS-REFERENCE TO RELATED APPLICATIONS

This application is a divisional of, and claims priority to and the benefit of, U.S. Ser. No. 14/981,342 filed Dec. 28, 2015 and entitled "PLATE ASSEMBLIES INCLUDING FLOATING WEAR LININGS FOR MULTI-DISK BRAKE SYSTEMS AND METHODS FOR REDUCING VIBRATION IN A MULTI-DISK BRAKE SYSTEM." The above referenced application is hereby incorporated by reference in its entirety.

FIELD

The present disclosure relates to aircraft brake systems. In particular, the disclosure relates to plate assemblies including floating plate wear linings for multi-disk brake systems and methods for reducing vibration in a multi-disk brake system.

BACKGROUND

Aircraft brake systems typically employ a series of friction disks forced into contact with each other to stop the aircraft. Friction disks splined to a non-rotating wheel axle are interspersed with friction disks splined to a rotating wheel. The friction disks withstand and dissipate the heat (and thus may be referred to as a "heat sink assembly") generated from contact between one another during braking. During high speed landings and rejected takeoffs ("RTOs"), the amount of heat and force generated can affect the friction disks that are made of carbon composite materials. Carbon composite materials are suited for high temperature use and are now the standard for friction disks in aircraft brake assemblies. However, carbon composite disks can be expensive to manufacture, especially ones having the thickness desirable for use on an aircraft. In addition, friction disks may be prone to vibration.

SUMMARY

A plate assembly for a multi-disk brake system is provided, in accordance with various embodiments. The plate assembly includes at least one of a pressure plate or an end plate and a floating plate wear liner mounted against the at least one of the pressure plate or the end plate. The floating plate wear liner is configured to contact a contact surface of an adjacent rotatable friction disk in response to the multi-disk brake system being actuated.

A multi-disk brake system is provided, in accordance with various embodiments. The multi-disk brake system comprises a plurality of adjacent stator-rotor pairs comprising friction disks, a pressure plate at a first end of the plurality of adjacent stator-rotor pairs and adjacent a front rotor thereof, and an end plate at a second end of the plurality of adjacent stator-rotor pairs and adjacent an aft rotor thereof. A floating plate wear liner is mounted against at least one of the pressure plate or the end plate.

A method is provided for reducing vibration in a multi-disk brake system comprising a plurality of friction disks disposed between a pressure plate and an end plate, in accordance with various embodiments. The method comprises positioning a floating plate wear liner against a friction surface of at least one of the pressure plate or the end plate and mounting the floating plate wear liner against the friction surface of the at least one of the pressure or the end plate.

In any of the foregoing embodiments, the adjacent rotor comprises at least one of a front friction disk or an aft friction disk of a plurality of friction disks disposed axially between the pressure plate and the end plate. The floating plate wear liner is concentrically and axially constrained in position against the at least one of the pressure plate or the end plate. The floating plate wear liner mounted against the at least one of the pressure plate or the end plate substantially maintains a concentric relationship with the at least one of the pressure plate or the end plate. The floating plate wear liner further comprises an inner wall and an outer wall. The floating plate wear liner is mounted at the inner wall and the outer wall for radially constraining the floating plate wear liner against the at least one of the pressure plate or the end plate to maintain the concentric relationship with the at least one of the pressure plate or the end plate. The floating plate wear liner is mounted against the at least one of the pressure plate or the end plate by a mechanical fastener. The multi-disk brake system comprises a plurality of friction disks. The floating plate wear liner is mounted against an axial facing friction surface of the at least one of the pressure plate or the end plate. The floating plate wear liner has a wear surface configured to contact a contact surface of the adjacent rotatable friction disk. An adjacent rotor comprises at least one of a front rotor or an aft rotor of a plurality of friction disks disposed between the pressure plate and the end plate.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical, and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Various embodiments are directed to plate assemblies including floating plate wear linings for multi-disk brake systems and methods for reducing vibration in a multi-disk brake system. The floating plate wear linings may be mounted respectively against at least one of a pressure plate or an end plate of the multi-disk brake system such that floating plate wear liner is radially and axially against the friction surface of the at least one of the pressure plate or the end plate to maintain a concentric relationship therewith. By maintaining the floating plate wear liner against the at least one pressure plate or end plate, and maintaining the concentric relationship between the floating plate wear liner and the at least one pressure plate or end plate, the vibration of the multi-disk brake system is reduced according to various embodiments as herein described.

Figure 1:
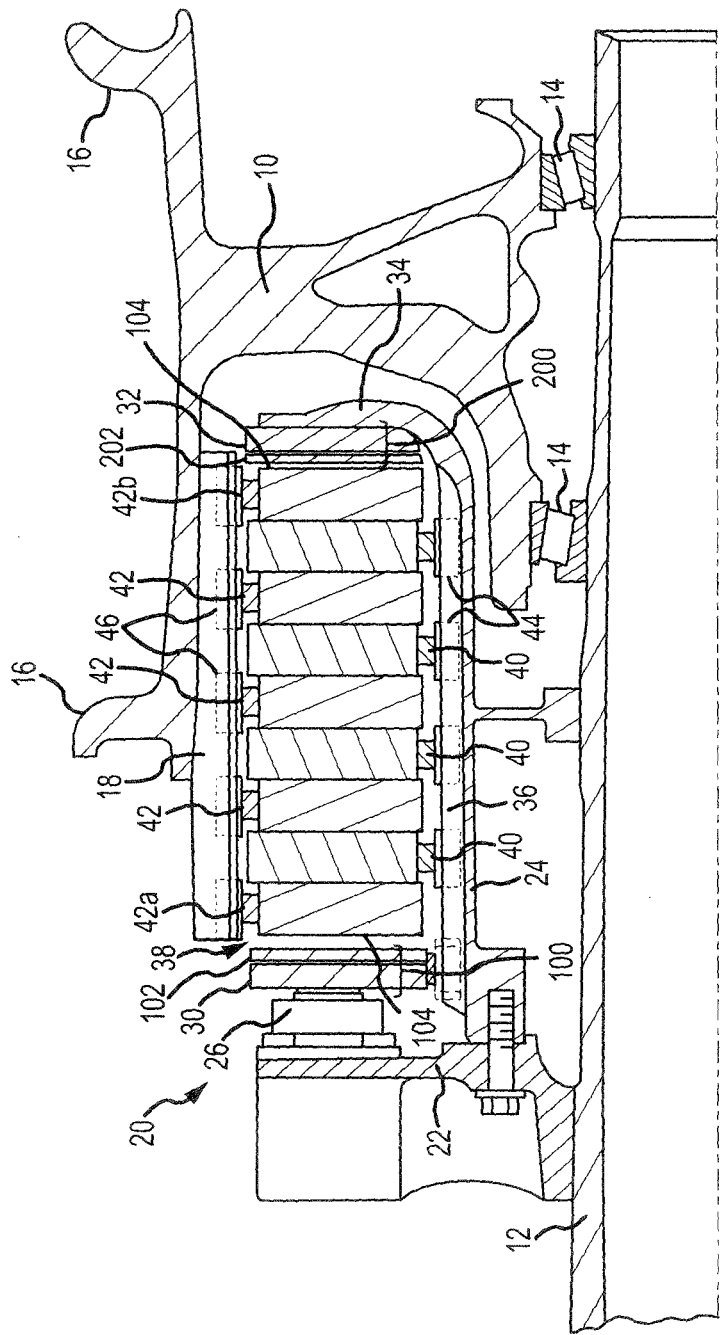
FIG. 1 illustrates, in accordance with various embodiments, a multi-disk brake system in an unactuated condition.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. The wheel 10 includes rims 16 for supporting a tire (not shown), and a series of axially extending rotor splines 18 (one shown). The rotation of the wheel 10 is modulated by the multi-disk brake system 20. The multi-disk brake system 20 includes a torque flange 22, a torque tube 24, a plurality of pistons 26 (one shown), a pressure plate 30, and an end plate 32. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1, or attached as separate components.

The multi-disk brake system 20 also includes a plurality of friction disks 38. The plurality of friction disks 38 includes at least one non-rotatable friction disk 40 (also known as a stator 40), and at least one rotatable friction disk 42 (also known as a rotor 42). The stators 40 and rotors 42 may be located adjacent to one another in the multi-disk brake system 20, forming a plurality of adjacent stator-rotor pairs. While not illustrated for ease of illustration, the at least one stator 40 may further comprise a stator core with a floating stator wear liner on one or both sides thereof. The at least one rotor may further comprise a rotor core with a floating rotor wear liner on one or both sides thereof. Each stator 40 and each rotor 42 includes an attachment structure. In the embodiment of FIG. 1, each of four stators 40 includes a plurality of stator lugs 44 at circumferentially spaced positions around stator 40 as an attachment structure. Similarly, each of five rotors 42 includes a plurality of rotor lugs 46 at circumferentially spaced positions around rotor 42 as an attachment structure. In the embodiment of FIG. 1, pressure plate 30, end plate 32, and the plurality of friction disks 38 are all annular structures made at least partially from a carbon composite material. In various embodiments, at least one of the pressure plate 30 or the end plate 32 may be made from a ceramic matrix composite (CMC) material.

The torque flange 22 is mounted to the axle 12. The torque tube 24 is bolted to the torque flange 22 such that a reaction plate 34 is near an axial center of wheel 10. The end plate 32 is connected to a surface of the reaction plate 34 facing axially inward. Thus, the end plate 32 is non-rotatable by virtue of its connection to the torque tube 24. The stator splines 36 support the pressure plate 30 so that pressure plate 30 is also non-rotatable. The stator splines 36 also support the stators 40. The stators 40 engage stator splines 36 with gaps formed between stator lugs 44. Similarly, the rotors 42 engage rotor splines 18 with gaps formed between rotor lugs 46. Thus, the rotors 42 are rotatable by virtue of their engagement with the rotor splines 18 of the wheel 10.

As shown in FIG. 1, the rotors 42 are arranged with the end plate 32 on one end (an aft end of the plurality of friction disks 38), the pressure plate 30 on the other end (a front end of the plurality of friction disks 38), and the stators 40 interleaved so that the rotors 42 are directly or indirectly adjacent to non-rotatable friction components. The pistons 26 are connected to the torque flange 22 at circumferentially spaced positions around the torque flange 22. The pistons 26 face axially toward wheel 10 and contact a side of the pressure plate 30 opposite the rotors 42. The pistons 26 may be powered electrically, hydraulically, or pneumatically.

Figure 2:
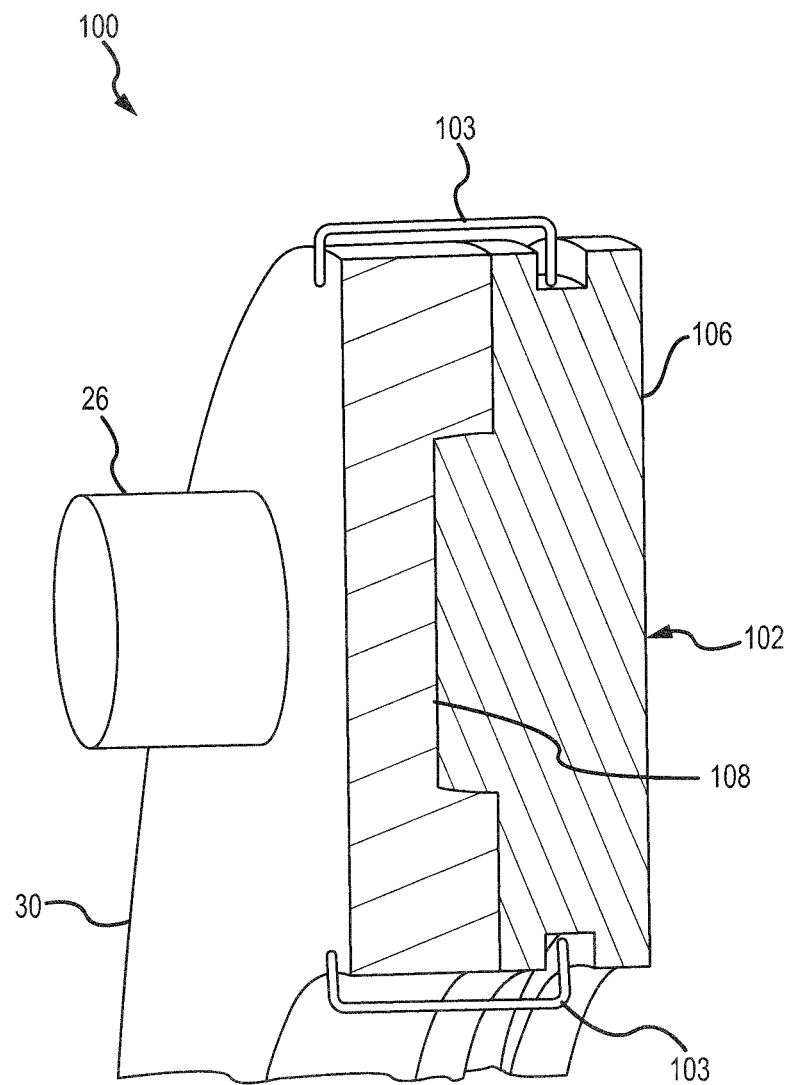
FIG. 2 illustrates, in accordance with various embodiments, a sectional view of a first plate assembly including a pressure plate and a first floating plate wear liner mounted against the pressure plate by an exemplary mechanical fastener (a spring retention clip in the depicted embodiment) at a radially outer portion and a radially inner portion of the pressure plate and the first floating plate wear liner.
Figure 3:
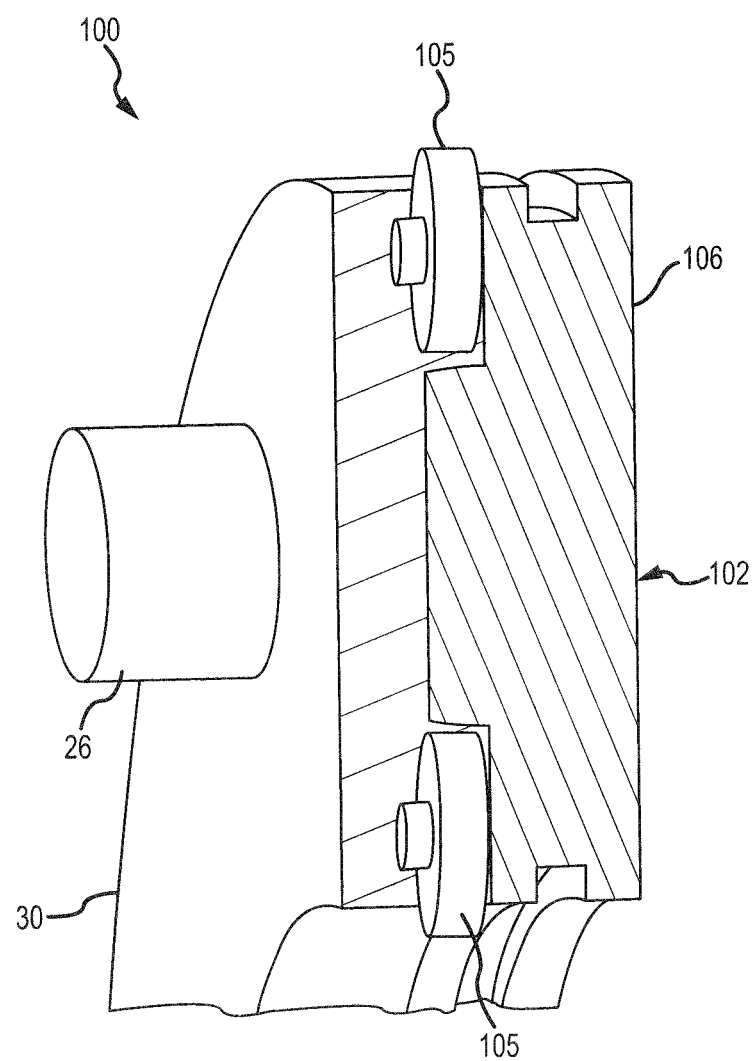
FIG. 3 illustrates, in accordance with various embodiments, another sectional view of the pressure plate and the first floating plate wear liner, with the first floating plate wear liner mounted against the pressure plate by another exemplary mechanical fastener (a pair of internally-mounted wheel bearings in the depicted embodiment) at the radially outer portion and the radially inner portion of the pressure plate and the first floating plate liner.

Referring to FIG. 2, a first plate assembly 100 comprising the pressure plate 30 and a first floating plate wear liner 102 is illustrated according to various embodiments. In accordance with various embodiments, the first floating plate wear liner 102 is mounted against the pressure plate 30. The first floating plate wear liner 102 is configured to contact a contact surface 104 of an adjacent rotor 42a when the multi-disk brake system is actuated. The first floating plate wear liner 102 has a wear surface 106 configured to contact the contact surface 104 of the adjacent rotor 42a. The adjacent rotor comprises a front rotor 42a (FIG. 1) of the plurality of friction disks 38 disposed between the pressure plate 30 and the end plate 32 in the multi-disk brake system. The first floating plate wear liner 102 is concentrically and axially constrained in position against the pressure plate 30. The first floating plate wear liner 102 is mounted against an axial facing friction surface 108 of the pressure plate 30. The first floating plate wear liner 102 mounted against the pressure plate 30 substantially maintains a concentric relationship with the pressure plate 30, thereby reducing vibration of the multi-disk brake system during actuation. The floating plate wear liner is mounted at the inner wall and the outer wall for radially constraining the floating plate wear liner 102 against the pressure plate 30 to maintain the concentric relationship with the pressure plate 30. The first floating plate wear liner 102 may be mounted against the pressure plate 30 by a mechanical fastener such as a retention clip 103 (FIG. 2). In various embodiments as depicted in FIG. 3, the first floating plate wear liner 102 may be mounted against the pressure plate 30 by a pair of internally-mounted wheel bearings 105, or the like.

Figure 4:
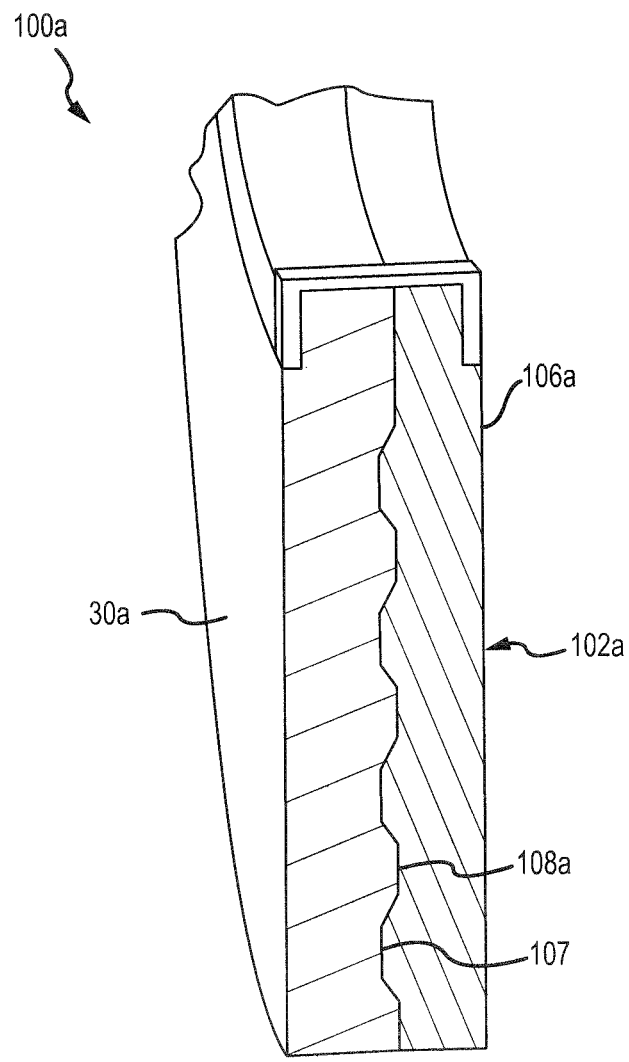
FIG. 4 illustrates, in accordance with various embodiments, another sectional view of the pressure plate and the first floating plate wear liner, with the first floating plate wear liner mounted against the pressure plate by a geometric interface extending between the outer wall and the inner wall of the pressure plate and between a friction surface of the pressure plate and a surface of the first floating plate wear liner that is opposite the first floating plate wear liner wear surface.

Referring now to FIG. 4, in various embodiments, a first plate assembly 100A may comprise a floating plate wear liner 102a mounted against a pressure plate 30a by a geometric interface 107 of the axial facing friction surface 108a of the pressure plate 30a and the floating plate wear liner 102a. The first floating plate wear liner 102a has a wear surface 106a configured to contact the contact surface 104 of the adjacent rotor 42a in the same manner as first floating plate wear liner 102 is configured to contact the contact surface 104 of the adjacent rotor. As like numerals denote like elements, reference numerals 30, 100, 102, 108 as used hereinafter respectively include like elements 30a, 100A, 102a, and 108a.

The surface of the first floating plate wear liner 102 opposite to the wear surface may have a profile and dimensions complementary to the profile and dimensions of the friction surface of the pressure plate 30 such that the wear surface and the friction surface mate to radially and axially constrain the first plate assembly. As the pressure plate 30 (and the end plate 32) only have one friction surface (as opposed to the rotors and stators that have two opposing friction surfaces), there is more space in the plate assemblies 100 (including 100A) and 200 for improved mounting of a floating plate wear liner against the respective pressure plate and/or end plate to radially and axially constrain the floating plate wear liner against the respective pressure plate and/or end plate.

In various embodiments, the first floating plate wear liner 102 may comprise an annular ring configured to contact the adjacent rotor 42a (i.e., the front friction disk (FIG. 1) at a first frictional interface. In various embodiments, the floating plate wear liner may comprise a substantially uniform thickness in an axial dimension. Each first floating plate wear liner 102 further comprises an outer wall and an inner wall extending between the wear surface and the opposite surface.

The pressure plate 30 and first floating plate wear liner 102 may comprise the same or different materials. For example, in various embodiments, the pressure plate 30 may comprise a first material such as a CMC material, and the first floating plate wear liner 102 may comprise a second material such as a carbon composite material. However, in various embodiments, the pressure plate 30 and the first floating plate wear liner 102 may both comprise a carbon composite material. The floating plate wear liner may comprise the same carbon composite material as the pressure plate 30 or a different carbon composite material as the pressure plate 30. In various embodiments, the material of the pressure plate 30 may be selected for its structural properties, thermal conductivity, heat capacity, and/or oxidation resistance properties. In various embodiments, a material of first floating plate wear liner 102 may be selected for its wear resistance and/or frictional properties. Thus, the first plate assembly 100 may contain the structural advantages of the pressure plate 30 and the frictional advantages of the first floating plate wear liner 102.

In various embodiments, first floating plate wear liner 102 may be replaceable, such that after floating plate wear liners 102 have been worn below a suitable operational thickness, floating plate wear liners 102 may be removed from pressure plate 30 and replaced by new or remanufactured wear liners. Use of first floating plate wear liner 102 may provide various advantages during brake system maintenance. For example, the first floating plate wear liner 102 may be removed and replaced without a need to remove and resurface or machine the pressure plate 30 or the adjacent rotor 42a for continued operation after wear liner replacement. Moreover, use of the first floating plate wear liner 102 at the first frictional interface (as the pressure plate 30 tends to move more axially than any other disk in the multi-disk brake system and thus the adjacent rotor 42a can become more misaligned than any other friction disk in the multi-disk brake system) may provide increased torsional damping relative to torsional damping that occurs at other positions in the multi-disk brake system, thereby significantly reducing vibration in the multi-disk brake system, particularly upon brake actuation. The first floating plate wear liner at the first frictional interface reduces/distributes an initial torque spike upon the first contact of the pressure plate 30 with the adjacent rotor 42a, such that the other friction disks in the multi-disk brake system have time to make contact/nest prior to significant brake force.

Figure 5:
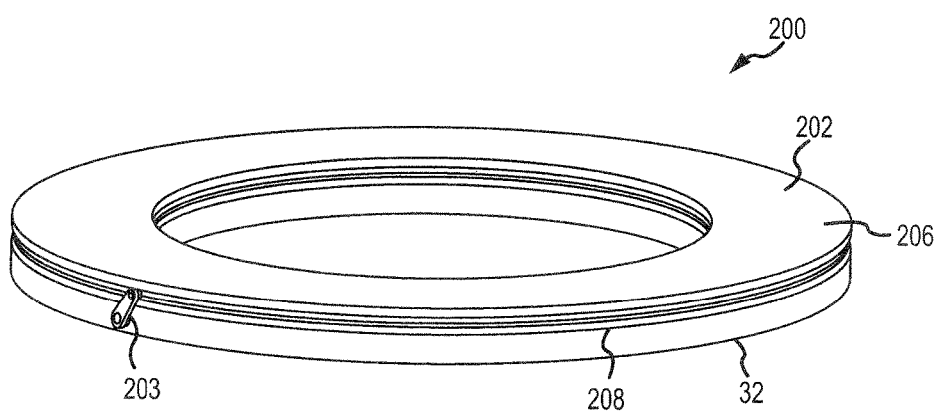
FIG. 5 illustrates, in accordance with various embodiments, a perspective view of a second plate assembly comprising an end plate and a second floating plate wear liner mounted against the end plate by an exemplary spring retention clip.
Figure 6:
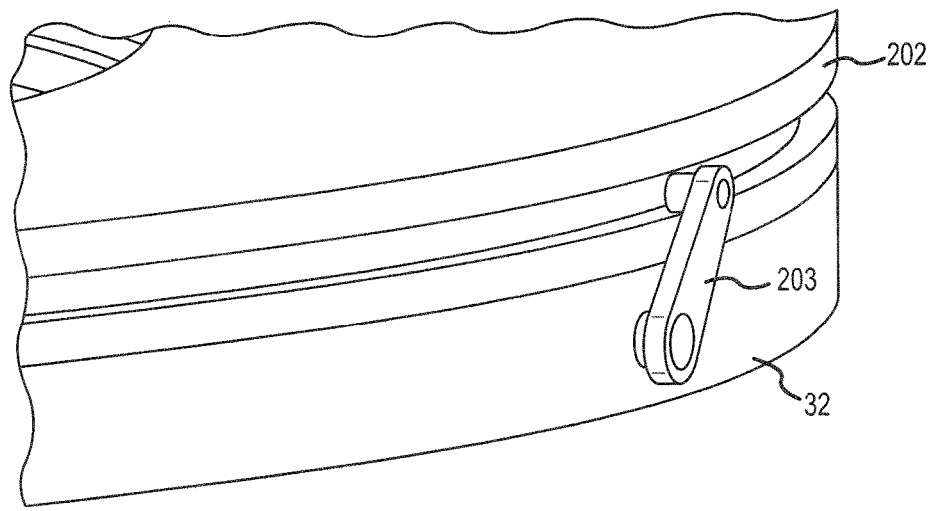
FIG. 6 illustrates, in accordance with various embodiments, an enlarged view of the exemplary spring retention clip of FIG. 5.

Referring again to FIG. 1 and now to FIGS. 5 and 6, according to various embodiments, the multi-disk brake system may additionally or alternatively comprise a second plate assembly 200 comprising the end plate 32 and a second floating plate wear liner 202. In accordance with various embodiments, the second floating plate wear liner 202 may be mounted against the end plate 32. Like the first floating plate wear liner 102, the second floating plate wear liner 202 is configured to contact the contact surface 104 of the adjacent rotor 42b in response to the multi-disk brake system being actuated. The floating plate wear liner 202 has a wear surface 206 configured to contact the contact surface 104 of the adjacent rotor 42b. The adjacent rotor 42b comprises an aft rotor (FIG. 1) of the plurality of friction disks disposed between the pressure plate 30 and the end plate 32 in the multi-disk brake system. The second floating plate wear liner 202 is concentrically and axially constrained in position against the end plate 32. The second floating plate wear liner 202 is mounted against an axial facing friction surface 208 of the end plate 32. The second plate wear liner 202 mounted against the end plate 32 substantially maintains a concentric relationship with the end plate 32, thereby reducing vibration of the multi-disk brake system during actuation. The second floating plate wear liner is mounted at the inner wall and the outer wall for radially constraining the second floating plate wear liner 202 against the end plate 32 to maintain the concentric relationship with the end plate 32. The second floating plate wear liner 202 may be mounted against the end plate 32 by a mechanical fastener such as a retention clip 203 (FIGS. 5 and 6), a pair of internally-mounted wheel bearings (similar to that shown in FIG. 3 for mounting the first floating plate wear liner 102 against pressure plate 30), or the like. In various embodiments, the second floating plate wear liner 202 may be mounted against the end plate 32 by a geometric interface in the same manner as first floating plate wear liner 102a is shown mounted against the pressure plate 30a in FIG. 4.

In various embodiments, the second floating plate wear liner 202 may comprise an annular ring configured to contact the adjacent rotor 42b (i.e., the aft rotor) (FIG. 1). In various embodiments, the second floating plate wear liner 202 may comprise a substantially uniform thickness in an axial dimension. The end plate 32 and the second floating plate wear liner 202 may comprise the same or different materials. For example, in various embodiments, the end plate 32 may comprise a first material such as a CMC material, and the second floating plate wear liner 202 may comprise a second material such as a carbon composite material. However, in various embodiments, the end plate 32 and the second floating plate wear liner 202 may both comprise a carbon composite material. The second floating plate wear liner 202 may comprise the same carbon composite material as the end plate 32 or a different carbon composite material as the end plate 32. In various embodiments, the material of the end plate 32 may be selected for its structural properties, thermal conductivity, heat capacity, and/or oxidation resistance properties. In various embodiments, a material of second floating plate wear liner 202 may be selected for its wear resistance and/or frictional properties. Thus, the second plate assembly 200 may contain the structural advantages of the end plate 32 and the frictional advantages of the second floating plate wear liner 202.

In various embodiments, the second floating plate wear liner 202 (as well as those of the floating stator and rotor wear liners) may be replaceable, such that after the second floating plate wear liner 202 has been worn below a suitable operational thickness, the second floating plate wear liner 202 may be removed from end plate 32 and replaced by new or remanufactured wear liners. Use of second floating plate wear liner 202 may provide various advantages during brake system maintenance. For example, second floating plate wear liners 202 may be removed and replaced without a need to remove and resurface or machine the end plate 32 or the adjacent rotor 42b for continued operation after wear liner replacement.

While the first floating plate wear liner 102 has been described as mounted against the pressure plate 30 and the second floating plate wear liner 202 has been described as mounted against the end plate 32, it is to be understood that there may be only one floating plate wear liner mounted against either the pressure plate 30 or the end plate 32 in the multi-disk brake system, according to various embodiments. Furthermore, as noted previously, the multi-disk brake system may or may not include floating stator wear liners and/or floating rotor wear liners. Retention axially of the floating plate wear liners results in better retention radially.

During aircraft braking, a torque may be applied to the floating plate wear liners 102 and/or 202. For example, and with reference to FIG. 1, a torque may be applied by an adjacent rotatable brake system component, such as pressure plate 30 with rotor 42a or end plate 32 with rotor 42b, during braking of a moving aircraft. The torque may cause a shear force that, in the absence of a counteracting force, acts to rotate floating plate wear liner relative to the adjacent rotor. Contact between the rotor contact surface and the wear surface of the respective floating plate wear liner may counteract an applied torque and provide torsional damping.

Figure 7:
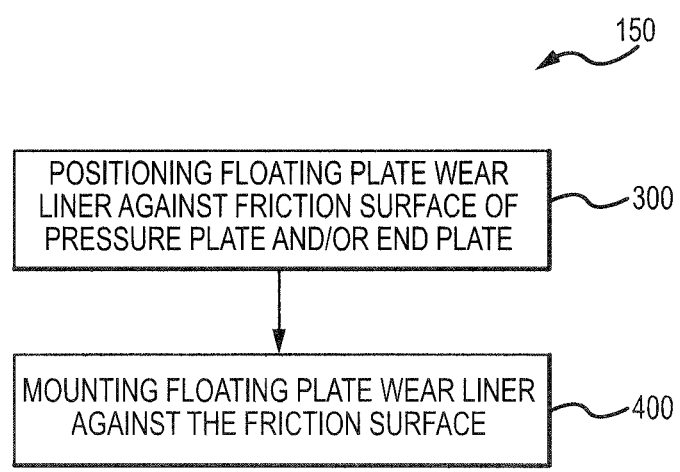
FIG. 7 is a flow diagram of a method for reducing vibration in a multi-disk brake system, in accordance with various embodiments.

Referring now to FIG. 7, in accordance with various embodiments, a method 150 for reducing vibration in the multi-disk brake system begins by positioning the floating plate wear liner 102 and/or 202 against a friction surface of at least one of the pressure plate or the end plate (step 300) and mounting the floating plate wear liner against the friction surface of the at least one of the pressure or the end plate (step 400) as previously described. More specifically, as noted previously, the floating plate wear liner may be mounted against the pressure plate 30 by the mechanical fastener such as the retention clip 103 (FIG. 2) and/or against the end plate 32 by the mechanical fastener such as the retention clip 203 (FIGS. 5 and 6), the pair of internally-mounted wheel bearings 105 (FIG. 3), or the like. In various embodiments, the floating plate wear liner may be mounted against the pressure plate and/or end plate by the geometric interface 107.

From the foregoing, it is to be appreciated that torsional damping is provided by the first and/or second floating plate wear liners being mounted respectively against the pressure plate and/or the end plate of the multi-disk brake system. As such, vibration of the multi-disk brake system is reduced.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A plate assembly for a multi-disk brake system,
at least one of a pressure plate or an end plate; and
a floating plate wear liner mounted against the at least one of the pressure plate or the end plate by a pair of internally-mounted wheel bearings, the floating plate wear liner configured to contact a contact surface of an adjacent rotatable friction disk in response to the multi-disk brake system being actuated, wherein the pair of internally-mounted wheel bearings are at a radially outer portion and a radially inner portion of the pressure plate and the floating plate wear liner.

2. The plate assembly of claim 1, wherein the adjacent rotatable friction disk comprises at least one of a front rotor or an aft rotor of a plurality of friction disks disposed axially between the pressure plate and the end plate.

3. The plate assembly of claim 1, wherein the floating plate wear liner is concentrically and axially constrained in position against the at least one of the pressure plate or the end plate.

4. The plate assembly of claim 3, wherein the floating plate wear liner mounted against the at least one of the pressure plate or the end plate substantially maintains a concentric relationship with the at least one of the pressure plate or the end plate.

5. The plate assembly of claim 4, wherein the floating plate wear liner further comprises an inner wall and an outer wall, wherein the floating plate wear liner is mounted at the inner wall and the outer wall for radially constraining the floating plate wear liner against the at least one of the pressure plate or the end plate to maintain the concentric relationship with the at least one of the pressure plate or the end plate.

6. The plate assembly of claim 1, wherein the multi-disk brake system comprises a plurality of friction disks.

7. The plate assembly of claim 1, wherein the floating plate wear liner is mounted against an axial facing friction surface of the at least one of the pressure plate or the end plate.

8. The plate assembly of claim 1, wherein the floating plate wear liner has a wear surface configured to contact the contact surface of the adjacent rotatable friction disk.

9. A multi-disk brake system comprising:
a plurality of adjacent stator-rotor pairs comprising a plurality of friction disks;
a pressure plate at a first end of the plurality of adjacent stator-rotor pairs and adjacent a front rotor thereof;
an end plate at a second end of the plurality of adjacent stator-rotor pairs and adjacent an aft rotor thereof; and
a floating plate wear liner mounted against at least one of the pressure plate or the end plate by a pair of internally-mounted wheel bearings, wherein the pair of internally-mounted wheel bearings are at a radially outer portion and a radially inner portion of the pressure plate and the floating plate wear liner.

10. The multi-disk brake system of claim 9, wherein the plurality of friction disks are disposed between the pressure plate and the end plate.

11. The multi-disk brake system of claim 9, wherein the floating plate wear liner is concentrically and axially constrained in position against the at least one of the pressure plate or the end plate.

12. The multi-disk brake system of claim 11, wherein the floating plate wear liner mounted against the at least one of the pressure plate or the end plate substantially maintains a concentric relationship with the at least one of the pressure plate or the end plate.

13. The multi-disk brake system of claim 12, wherein the floating plate wear liner further comprises an inner wall and an outer wall, wherein the floating plate wear liner is mounted at the inner wall and the outer wall for radially constraining the floating plate wear liner against the at least one of the pressure plate or the end plate to maintain the concentric relationship with the at least one of the pressure plate or the end plate.

14. The multi-disk brake system of claim 9, wherein the floating plate wear liner is mounted against an axial facing friction surface of the at least one of the pressure plate or the end plate.

15. The multi-disk brake system of claim 9, wherein the floating plate wear liner has a wear surface configured to contact a contact surface of the adjacent rotor.

16. A method for reducing vibration in a multi-disk brake system comprising a plurality of friction disks disposed between a pressure plate and an end plate, the method comprising:
positioning a floating plate wear liner against a friction surface of at least one of the pressure plate or the end plate; and
mounting the floating plate wear liner against the friction surface of the at least one of the pressure or the end plate by a pair of internally mounted wheel bearings at a radially outer portion and a radially inner portion of the pressure plate and the floating plate wear liner.

17. The method of claim 16, wherein the friction surface is axially facing and mounting the floating plate wear liner comprises mounting the floating plate wear liner against the axially facing friction surface of the at least one of the pressure plate or the end plate.

* * * * *